United States Patent [19]

Clark et al.

[11] Patent Number: 4,459,561

[45] Date of Patent: Jul. 10, 1984

[54] PHASE-LOCK LOOP CONTROLLED OBJECT DETECTOR OSCILLATOR

[75] Inventors: Michael A. G. Clark, Hampshire; Robert C. Bromwich, Wiltshire, both of England

[73] Assignee: Sarasota Automation Limited, Winchester, England

[21] Appl. No.: 313,011

[22] Filed: Oct. 19, 1981

[30] Foreign Application Priority Data

Nov. 14, 1980 [GB] United Kingdom ............... 8036701

[51] Int. Cl.³ .................... G01V 3/11; H03L 7/12
[52] U.S. Cl. ........................ 331/65; 324/236;
324/328; 331/4; 331/17; 331/27; 340/941
[58] Field of Search ............... 331/65, 4, 17, 25, 27;
324/207, 222, 236, 327, 328; 340/38 L, 551

[56] References Cited

U.S. PATENT DOCUMENTS

| 3,397,364 | 8/1968 | Crandall | 331/65 |
| 3,870,990 | 3/1975 | Fathauer | 340/38 L |
| 4,262,264 | 4/1981 | Vandegraaf | 331/4 |
| 4,358,749 | 11/1982 | Clark | 340/38 L |

FOREIGN PATENT DOCUMENTS 2026169 1/1980 United Kingdom .

OTHER PUBLICATIONS

Kimberley–Jennings, "Metal Detector", Elektor, vol. 5, Jul./Aug. 1979, pp. 7-77, 7-78.

Primary Examiner—Siegfried H. Grimm
Attorney, Agent, or Firm—Sughrue, Mion, Zinn, Macpeak and Seas

[57] ABSTRACT

A vehicle detector installation includes a loop oscillator the loop of which is laid in the roadway and which is locked in operation to a voltage controlled oscillator (VCO). Vehicle detection is effected by a phase detector monitoring the phase difference between the oscillators. The VCO is incorporated in a phase-lock loop (PLL) that is capable of locking to a multiple of a reference frequency oscillator over a range of multiples. To achieve the locking of the loop oscillator to the VCO, means are provided for disabling the normal operation of the PLL and sweeping the VCO over its range of frequency until the phase detector indicates that the loop oscillator and VCO frequencies are equal. This indication activates the PLL to its normal operation to pull the VCO and therewith the loop oscillator to an adjacent multiple of the reference frequency. The PLL is maintained by a repeated charge/discharge cycle of the VCO capacitor that is dependent on the phase of the reference oscillator and the VCO.

19 Claims, 4 Drawing Figures

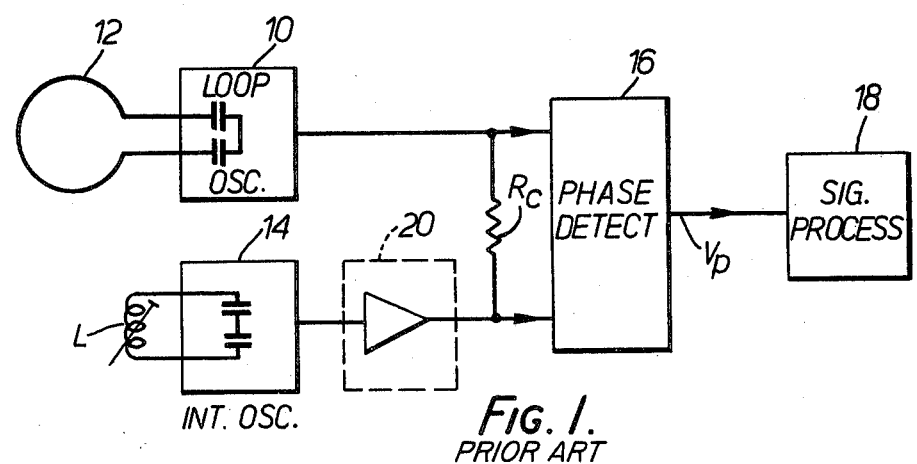
FIG. 1.
PRIOR ART
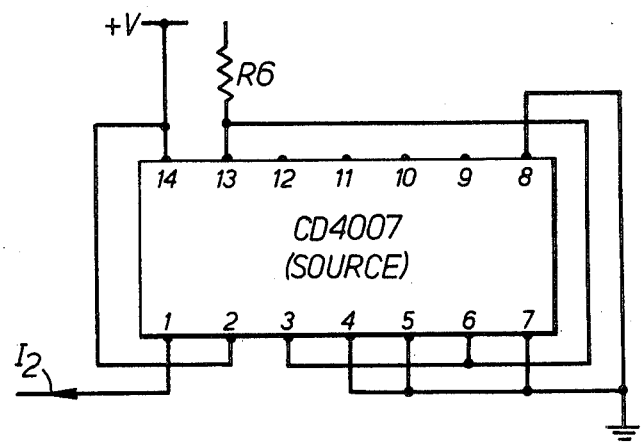
FIG. 4.
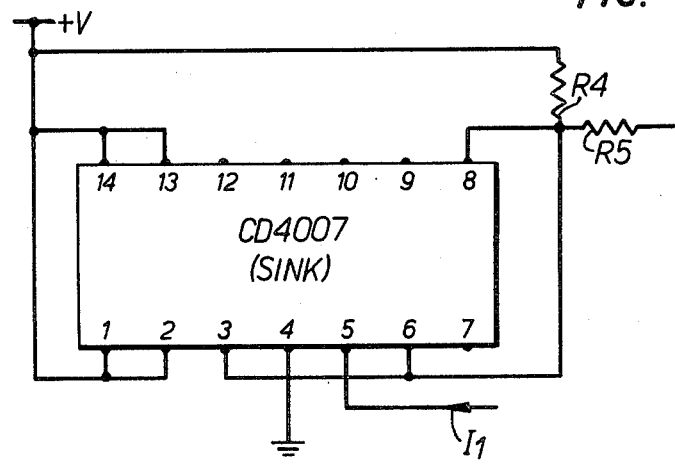

PHASE-LOCK LOOP CONTROLLED OBJECT DETECTOR OSCILLATOR

FIELD OF THE INVENTION

This invention relates to an object detector and finds particular application in the field of vehicle detection where a detector loop is laid in the roadway or other place where vehicle detection is required.

BACKGROUND OF THE INVENTION

More particularly the invention is concerned with a locked oscillator type of detector in which the detector loop is made a frequency determining element of a first oscillator and which comprises a second internal oscillator which is coupled to the first and its frequency adjusted such that by virtue of the mutual coupling the oscillator frequencies lock together. A detector of this type is disclosed in British Patent Specification No. 1,338,062 of Wilcox. When a vehicle influences the detector loop oscillator the frequencies of the two oscillators remain locked but there is a shift of their relative phase which is detected and processed to provide an indication of the presence of a vehicle.

In known locked oscillator detectors, the detector loop is made an element of a conventional tuned circuit for the first or loop oscillator and the internal oscillator has to be adjusted in frequency until the oscillators lock at or near the natural frequency of the loop oscillator. The natural frequency can vary widely depending on the loop requirements of each installation and the internal oscillator has to be manually tuned in each case.

SUMMARY OF THE INVENTION

It is therefore generally desirable to provide for automatic tuning of the internal oscillator, thereby avoiding the need for manual setting and without needing to know the natural frequency of the loop oscillator. It is then necessary to ensure the lock frequency acquired is held. There will be described hereinafter an embodiment of the invention which achieves these aims.

In one aspect the present invention is applied to an object detector comprising a first oscillator having an inductive object sensing loop as a frequency determining element therefor, and a second tunable oscillator and means for coupling energy from the second to the first oscillator whereby the first oscillator may be locked to the second upon tuning of the second oscillator; a phase detector responsive to the first and second oscillator signals to provide a signal representing the phase difference therebetween when the oscillators are locked; and signal processing means responsive to said phase difference signal to provide an object indicative signal. The invention proposes the improvement wherein said second oscillator is made the controlled oscillator of a phase locked loop (PLL) having a reference frequency source; and wherein there is provided first means to sweep said second oscillator from one end of a frequency range while disabling the normal operation of the phase lock loop; and second means to detect the locking of the first oscillator to the second and activate said first means to enable the normal operation of the phase lock loop to lock the second oscillator, and therewith the first, with respect to the reference frequency at a frequency at or closely adjacent to that at which locking of the first to the second oscillator was detected.

According to another aspect of the invention there is provided an object detector including a first oscillator having an object-sensitive inductive loop as a frequency determining element therefor; a phase lock loop (PLL) including a voltage controlled oscillator (VCO) and a reference frequency source to which the VCO frequency is lockable; means coupling the VCO to the first oscillator to inject the VCO signal into the first oscillator for locking the first oscillator frequency to that of the VCO; means responsive to the first oscillator and VCO signals to provide a signal indicative of the locking condition; control means connected to the PLL and settable into a first state disabling normal operation of the PLL and into a second state enabling normal operation of the PLL; means activated by said control means being set into its first state to cause said VCO to sweep over a frequency range; and said control means being responsive to said locking indicative signal to be set into its second state.

The invention and its practice will be further described with reference to the accompanying drawings.

BRIEF DESCRIPTION OF THE DRAWINGS

FIG. 1 is a block diagram illustrating a prior locked oscillator vehicle detector;

FIG. 4 shows the pin connection diagrams of two integrated circuit devices used in the phase lock loop.

THE PRIOR ART

Figure 2:
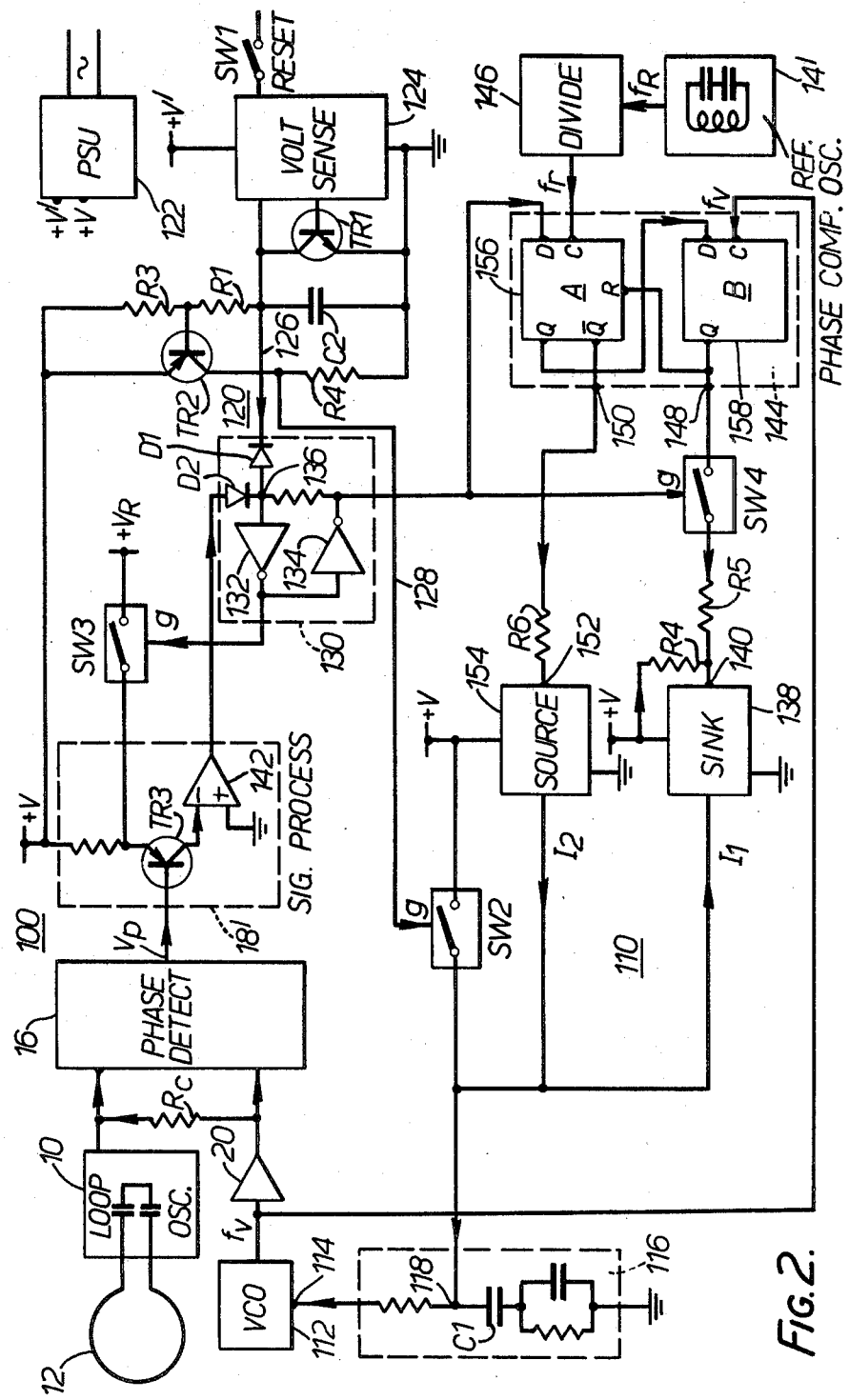
FIG. 2 is a circuit diagram partly in blocked diagram form, partly schematic, illustrating a locked oscillator vehicle detector embodying the present invention.

Referring to FIG. 1, the figure shows the essential circuit blocks of a locked oscillator vehicle detector such as described in the aforementioned Wilcox specification No. 1,338,062.

The detector comprises a road loop oscillator 10 whose inductive vehicle detecting loop 12 laid in the roadway is made a frequency determining element of a resonant tank circuit of say a Colpitts' oscillator (not shown in detail). The detector also has an internal oscillator 14 with, in this case, a manually tunable inductor L also forming part of the resonant tank circuit of a Colpitts' oscillator. The oscillator outputs are applied to a phase detector 16 which may, in accord with specification No. 1,338,062, be based on a transistor to the base and emitter of which the respective oscillator signals are applied and at the collector of which is developed an output signal dependent on the phase relationship of the oscillator signals. The phase-dependent output signal is applied to a processing circuit 18 which analyses phase changes to determine the presence of a vehicle at the road loop 12 and which may contain what are known as tracking facilities, all as described in specification No. 1,338,062.

To give the required phase dependent response the two oscillators are locked in frequency through a mutual coupling element $R_c$. Ignoring the unit in dashed line, energy transfer is bidirectional and the oscillators achieve a mutually-dependent lock frequency as the frequency of internal oscillator 14 is tuned to approach that of the loop oscillator 10. A vehicle presence at the loop 12 tends to increase the loop oscillator frequency. The two oscillators remain locked in frequency but the arrival of the vehicle changes the phase relationship between the oscillators. This mutual locking technique is also shown in specification No. 1,338,062.

An improvement in operating sensitivity can be achieved by inserting a buffer amplifier 20 to follow the internal oscillator. This is known as the driven-loop technique since energy coupling is now unidirectional from oscillator 12 to oscillator 10. The loop oscillator thus locks to the internal oscillator and for a given parameter change at the loop 12 there is a greater relative phase change in this case than in the mutually-coupled case.

In both cases it is necessary to manually tune the internal oscillator 14 to the loop oscillator frequency which, depending on the loop used in a given installation, may have a natural frequency extending over a wide range, e.g. 20 to 150 kHz. The sensing of the lock condition can be done by monitoring the output voltage $V_p$ of the phase comparator which will go from say a relatively low value to a relatively high value as lock is achieved.

DESCRIPTION OF THE PREFERRED EMBODIMENT

Turning now to the circuit of FIG. 2, this shows the application of the invention to a driven loop detector such as described above and like parts are given like reference numbers. Only so much of the detector circuit is illustrated as is necessary for an understanding of the practice of the present invention. The circuit may be divided broadly into three sections: the basic vehicle detector 100; a phase lock loop 110; and condition sensing and control circuitry 120.

The basic vehicle detector 100 comprises road loop oscillator 10, phase detector 16, coupling element $R_c$, buffer amplifier 20 and processing circuitry 18'. The circuit includes an internal oscillator 14' but this is not directly applied to the buffer stage 20 but is used as a reference to control the frequency of a voltage controlled oscillator (VCO) 112 in the phase lock loop (PLL) 110. Thus the loop oscillator 10 is locked to the VCO. As will become apparent from the following description, manual tuning of the oscillator 14' for lock is no longer required.

A small part of the signal processing circuit 18' is shown since conveniently parts of the circuit used in the signal processing for vehicle detection may be used in other functions to be described. The circuit is only illustrated to this extent.

The condition sensing and control circuitry 120 is employed to sense a low voltage condition set out below and is responsive to it to initiate an automatic operation for tuning of the VCO to the loop oscillator frequency, and in response to sensing of a state of lock between the VCO and the loop oscillator to establish the control of and the subsequent maintenance of the locked condition. The automatic tuning phase of operation will be called the tune mode. Upon the lock being sensed the circuit enters a mode of operation which will be called the lock mode in which the VCO is itself locked through the PLL to a multiple of a reference frequency derived from oscillator 14'. The multiple need not be known: by selection of a sufficiently low reference frequency $f_r$ the PLL locks the VCO, and therewith the loop oscillator, to a frequency close to that to which the VCO was tuned to achieve lock. Thus the frequency increment in which the PLL is steppable has to be small enough to ensure a proper retention of the locking of the loop oscillator whatever the VCO frequency achieved in the tune mode.

Control of the VCO is realised by the voltage (assumed positive with respect to ground) applied on terminal 114 via a loop filter 116. The VCO may be based on the CD4046 CMOS integrated circuit and full data is available in the manufacturer's data, e.g. RCA: "COS/MOS Integrated Circuits" data book published 1978. The VCO frequency increases with increasing positive voltage on terminal 114. The major element in the loop filter is a shunt capacitor C1 which effectively acts as an integrating capacitor in the control loop, the VCO presenting a high input impedance. The capacitor is charged or discharged via terminal 118 from one of three sources to be described. It will suffice to say for the present that on entering the tune mode the VCO is swept from the high frequency end of its range until lock is sensed. This requires placing a high initial voltage on the capacitor and then discharging the capacitor.

The tune mode is entered when power is first applied to the circuit or when the circuit supply voltage drops below a set value, or when a deliberate reset is applied to the circuit. The circuit contains a power supply unit (PSU) 122 which supplies an unregulated voltage $+V'$ and a regulated voltage $+V$. The unregulated voltage is sensed by a unit 124 which can take many forms, e.g. using a zener diode as a reference. Upon switch on of the PSU 122 the voltage supplied takes a short while to build up. While it is below a value set by the zener reference, or if later the voltage $+V'$ falls below that value, a transistor TR1 is turned fully on to discharge or hold discharged a capacitor C2 which is chargeable from the regulated voltage rail $+V$ through resistor R1 and through the base-emitter circuit of a transistor TR2 in parallel with resistor R3. The collector of transistor TR2 is grounded through resistor R4. As long as transistor TR1 is on, the junction of R1 and C2 is low and supplies a first control signal on line 126; also, transistor TR2 is turned on and its collector voltage is high. This is supplied as a second control signal on line 128. When the voltage sensed by unit 124 rises above the set value, transistor TR1 is turned off allowing capacitor C2 to charge with the time constant R1.C2 to essentially $+V$ so that the control signal on line 126 goes high. As C2 charges the transistor TR2 turns off so that its collector and line 128 go to ground potential (i.e. low). Even a momentary interruption in the supply voltage V' will cause TR1 to turn on and discharge capacitor C2 and time constant R1.C2 ensures lines 126 and 128 go low and high respectively to put the circuit into the tune mode as the PSU voltage rise. This low voltage sensing condition can be also manually induced in unit 124 by closing a reset switch SW1.

The control signal on line 126 is applied to a bistable device 130 which acts as a memory of whether the circuit is in the tune or lock mode and itself generates certain control signals. The bistable device can be realised in many ways. As shown it is a pair of coupled inverters 132, 134 having an input point 136 to which is connected a pair of input diodes D1 and D2. The diode D1 is poled to pass a low on line 126 to point 136 forcing the output of inverter 132 high and of inverter 134 low which state indicates the tune mode and is retained until point 136 is taken high. This cannot be done when line 126 goes high again because of the isolation afforded by diode D1. Thus the low on line 126 indicating entry into the tune mode is memorized by bistable device 130.

At the same time the high on line 128 is applied to the control gate g of a switch SW2 connected between the supply rail +V and the filter capacitor terminal 118. The high level closes the switch to charge capacitor C1 to +V and set the VCO frequency at the upper end of its range. As line 128 goes low again the switch is opened. The switch SW2 (like the switches SW3 and SW4 to be mentioned) is an electronic bilateral switch such as found in the CD4016 CMOS device which contains four such switches. The switch is closed or open dependent on its gate voltage being above or below a certain value.

Having put full voltage on the capacitor C1 it is now discharged by a constant current source 138 which since it is discharging current to ground acts as a sink. The value of the current $I_1$ is proportional to the value of an input current to the circuit 138 at terminal 140. The input current at this time is set by the value of a resistor R4 connected to the +V rail. It will be seen that the constant current sink is continuously active via resistor R4. The sink current here is relatively low and does not, of course, affect the charging of capacitor C1 through switch SW2. The capacitor C1 thus discharges to sweep the VCO frequency downwards towards the lock condition at a relatively slow rate.

Attention will now be given to the detection of the lock condition. For this purpose the condition of the output voltage $V_p$ of the phase detector 16 is monitored. In the lock condition the voltage $V_p$ will lie in the region of a certain voltage level—the precise value depends on the phase relationship—and this level is distinct from the level obtained when the loop oscillator and VCO frequencies are different.

In the illustrated case the voltage $V_p$ is applied to a transistor TR3 that is the input stage of the signal processing unit 18' and feeds other circuitry that is here simply represented as an inverter amplifier 142. The circuit elements would be part of more complex analysis and tracking circuitry not relevant to the present discussion save to note that where tracking circuitry is used it is not essential to achieve a precise phase relationship in the lock condition since the tracking circuitry will adapt to it within limits. This is of advantage as will become clearer below.

The lock detection is carried out by clamping the emitter of transistor TR3 to a reference voltage $+V_R$ applied by a switch SW3 of the same kind as switch SW2. Voltage $V_R$ is obtained from a zener diode and its value is selected with regards to the expected lock level of $V_p$. While $V_p$ is low (no lock) transistor TR3 is conducting and the output of amplifier 142 is low. The amplifier is connected through the diode D2 to the input point 136 of the memory bistable 130 currently in the tune mode state. As lock is reached, voltage $V_p$ rises—the transistion is abrupt—to cut off transistor TR3 and cause the output of amplifier 142 to go high. Diode D2 is poled to pass the high level to point 136 which in turn switches the bistable device 130 to its other or "lock mode" state. As the output of inverter 132 goes low switch SW3 is opened to allow transistor TR3 to revert to its normal signal processing role. Changes in the output of amplifier 142 during normal signal processing will not affect the bistable device which can only revert to the tune mode state by means of low level applied through diode D1. In the lock mode the output of inverter 134 is high and closes a further electronic switch SW4 that connects the input terminal 140 of current sink 138 to one output of a digital comparator 144 through a resistor R5 in readiness to now lock the VCO frequency, and therewith the loop oscillator frequency, to a multiple of a reference frequency.

Looking now at the PLL 110 in more detail, it is seen that the VCO output is connected directly to one input of phase comparator 144. The VCO frequency will be denoted $f_v$. The output of reference oscillator 14' at frequency $f_r$ is divided in frequency by a multi-stage binary divider 146 (e.g. a CD 4024 device) and the divided output frequency $f_r$ is applied as the reference frequency input to comparator 144.

The value of $f_r$ determines the frequency increments in which the VCO may be finally locked. As will be shown later the action of the digital phase comparator in the PLL allows $f_v$ to be locked to a multiple of $f_r$ over a wide range of multiple. The increment $f_r$ should be small enough such that upon locking the VCO in the PLL after indicating lock between the loop oscillator and the VCO, the consequent frequency shift in the VCO and loop oscillator does not take the processing circuit 18' out of the phase limits to which it can adapt. While $f_r$ can be made as small as desired, a typical value is about 200 Hz. If divider 146 uses seven binary stages (divide-by-128) then the reference oscillator 14' operates at about 25 kHz. This is convenient. It is of the same order as the frequency of loop oscillator 10. The reference oscillator remains a Colpitts oscillator using a similar circuit to that of the loop oscillator 10. In this way the reference oscillator can be given temperature drift characteristics akin to those of the loop oscillator and thus provide some degree of temperature compensation.

The comparator 144 has two outputs 148 and 150, the former being connected to switch SW4 as already mentioned and the latter being connected to the input 152 of source 154 whose output is connected to filter capacitor terminal 118. The source 154 is complementary to sink 138 producing a current $I_2$ to charge the capacitor C1 that is in direct proportion to the current in an input resistor R6. By alternately charging and discharging the capacitor by means of the current source and sink under the control of phase comparator 144, the VCO frequency $f_v$ is locked as a multiple of the reference frequency $f_r$ as will be further described with reference to FIG. 3.

The digital phase comparator 144 comprises a pair of D-type flip-flops 156 and 158, e.g. device 144 may be a type CD4013, that are clocked by the respective frequency signals $f_r$ and $f_v$ and are cross-connected to provide output signals in a manner that will be described with reference to FIG. 3. For convenience, the two flip-flops 156 and 158 will be called A and B and their conventionally notated terminals suffixed correspondingly to distinguish them. It will be noted that the D input of the reference frequency flip-flop A is taken to the second input of the memory bistable that is low in the tune mode. Consequently flip-flop A is continually clocked high at output $\overline{Q}_A$ so that the source 154 is not activated using the device specified below. $Q_A$ holds $D_B$ low so that flip-flop B is also clocked low at $Q_B$ in response to the frequency signal $f_v$. No change can take place in the comparator until terminal $D_A$ goes high when the comparator responds to the next leading edge of a clock pulse $f_r$. Terminal $D_A$ goes high when the memory bistable 130 changes state from the tune mode to the lock mode.

Figure 3:
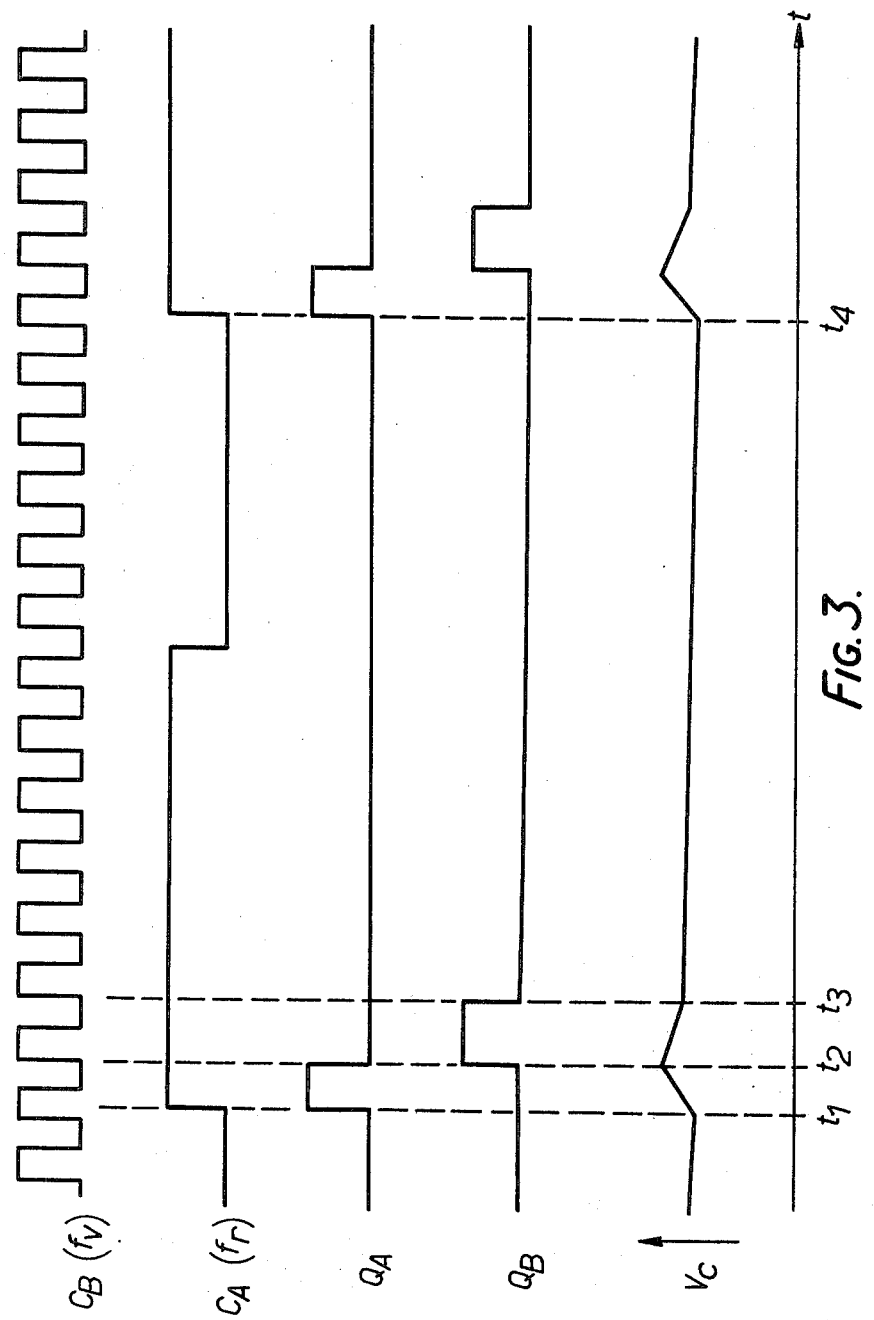
FIG. 3 shows a set of time waveforms relating to the operation of the phase lock loop 110 in FIG. 2.

FIG. 3 shows a set of time waveforms for $f_v$, $f_r$, $Q_A$, $Q_B$, and $V_c$ the filter capacitor voltage at terminal 118. With $D_A$ high, at $t_1$ $Q_A$ is clocked high at a leading edge (positive-going) of $f_r$. With $D_B$ high the next following leading edge of waveform $f_v$ at $t_2$ clocks $Q_B$ high to reset $Q_A$ low whereupon $Q_B$ is clocked low at the next leading edge of $f_r$ at $t_3$. It will be seen that $Q_B$ is high to drive an input current through resistor R5 to activate sink 138 for a full period ($t_3-t_2$) of $f_v$ while $\overline{Q}_A$ is low to activate current source 154 through resistor R6 for the interval ($t_2-t_1$) which is less than a full period of $f_v$.

The resultant capacitor voltage is seen at $V_c$ where the capacitor C1 is charged from $t_1$ to $t_2$, discharged from $t_2$ to $t_3$ and then continues very slowly discharging due to the continuously active sink input resistor R4 over the remaining portion $t_3$ to $t_4$ of the period of the reference frequency $f_r$. The operational cycle repeats at the next leading edge of $f_r$. The variations of $V_c$ shown are at some mean level of $V_c$ which is related to the value of the multiple $f_v/f_r$. It will be seen that the procedure illustrated in FIG. 3 can occur over a wide range of multiples, the interval (or phase difference) ($t_2-t_1$) adjusting itself to obtain a stable cycle in each case. The exact multiple of $f_r$ at which the PLL operates is not of importance. The finally locked frequency $f_v$ will lie near that at which initial lock of the VCO with the loop oscillator was signalled. Thus the circuit is able to tune and operate automatically at a stable frequency locked to $f_r$ anywhere within the VCO range.

Referring again to FIG. 3, it will be clear from the waveform $V_c$ that resistor R5 is of much smaller value than resistor R4 assuming approximately the same input voltage applied to each and the current in R5 is the predominant controlling factor during the interval ($t_3-t_2$). For example, for a capacitor C1 of 4.7 $\mu$F, R4 may be 1M$\Omega$ and R5 56 k$\Omega$.

When the PLL is settled it will be seen that for the $V_c$ cycle to remain in equilibrium the time integrals of the capacitor charging and discharging currents are equal. Because at equilibrium $t_2-t_1$ is less than $t_3-t_2$, resistor R6 needs to be made smaller than R5, assuming an equal applied voltage and equal source and sink proportionality ratio, and to be made somewhat smaller still to allow for the discharge during the interval ($t_4-t_3$). For the values of R4 and R5 given above a suitable value for R6 is 15 k.

The constant current source and sink may be realised in various ways. One convenient arrangement is to use for each the two complementary pairs of a CD4007 CMOS device (or CA 3600). Each device also contains an inverter and the two inverters are conveniently used to form the bistable memory 130. The pin connections of a CD4007 to form a constant current sink and source are shown in FIG. 4 at the bottom and top respectively. The unused pins 9-12 are those of the inverter. Further details are available in the data book referred to above. In the case of sink 138 of FIG. 2 the control input 140 needs to be taken high for the specified sink of FIG. 4 to operate. In the case of source 154 as exemplified in FIG. 4, the input 152 needs to be taken low to activate the source.

It will be appreciated that while the lock detector circuitry TR3, 142 has been described as part of the signal processing circuit 18' it can be made separately for this specific purpose.

What is claimed is:
1. In an object detector comprising:

a first oscillator having an inductive object sensing loop as a frequency determining element thereof; a second tunable oscillator and means for coupling energy from the second to the first oscillator whereby the first oscillator may be locked to the second upon tuning of the second oscillator; a phase detector responsive to the first and second oscillator signals to provide a signal representing the phase difference therebetween when the oscillators are locked; and signal processing means responsive to said phase difference signal to provide an object indicative signal; wherein said second oscillator is the controlled oscillator of a phase lock loop (PLL) having a reference frequency source; and wherein there is provided first means to sweep said second oscillator from one end of a frequency range while disabling the normal operation of the phase lock loop; and second means to detect during said sweep the point at which the frequency of the second oscillator becomes equal to that of the first and thereupon reestablish the normal operation of the phase lock loop to cause the second oscillator, and therewith the first, to lock at one of a plurality of frequencies related to an output of the reference frequency oscillator, the particular frequency being at or closely adjacent to that at which equalisation of the frequencies of the first and second oscillators was detected.

2. An object detector as claimed in claim 1 in which said second oscillator comprises a voltage controlled oscillator (VCO) and has a control voltage input connected to a filter capacitor in the phase lock loop, and wherein said first means comprises means for establishing a predetermined voltage on the capacitor to set the VCO to said one range end and for sweeping the capacitor voltage and therewith the VCO frequency.

3. An object detector as claimed in claim 2 in which said first means includes a bistable device having an output coupled to the phase lock loop, a first input for receiving a signal to put said bistable device into a first state disabling the normal operation of the phase lock loop, and a second input connected to said second means so as to be activated to a second state when said oscillator frequency equalisation is detected to enable said PLL for normal operation.

4. An object detector as claimed in claim 3 in which said second means comprises a circuit portion of the signal processing means that receives said phase difference signal.

5. An object detector as claimed in claim 4 in which said circuit portion has associated therewith means controlled by the output of said bistable device to set said circuit portion into a predetermined condition for responding to said phase difference signal to detect the attainment of the frequency equalisation condition when said bistable device is in said first state, the last-mentioned means being disabled when the bistable device is in its second state to enable the circuit portion to perform its normal function in the signal processing means.

6. An object detector as claimed in claim 2 in which said PLL comprises a first and a second current source connected to said filter capacitor to supply current to charge and discharge same respectively, and a comparator for controlling the relative periods of operation of said current sources in dependence on the phase of frequency signals from said reference frequency source and said VCO.

7. An object detector as claimed in claim 6 in which said PLL is operable to lock said VCO frequency over a range of multiples of the reference frequency.

8. An object detector as claimed in claim 6 in which said means for establishing a predetermined capacitor voltage and for sweeping the voltage comprises means operable temporarily to connect the capacitor to a source of said predetermined voltage and means connected to one of said current sources to control the latter to cause sweeping of the capacitor voltage.

9. An object detector as claimed in claim 1 in which said first means comprises sensing means responsive to a voltage level and operable in response to said voltage level being below a predetermined value to initiate the sweeping of said oscillator.

10. An object detector as claimed in claim 3 in which said PLL is operable to lock said VCO frequency to one of a range of multiples of said reference frequency and wherein said PLL comprises a first and a second current source connected to said filter capacitor to supply current to charge and discharge same respectively, and a comparator for controlling the relative periods of operation of said current sources in dependence on the phase of frequency signals from said reference frequency source and said VCO.

11. An object detector as claimed in claim 10 in which said means for establishing a predetermined capacitor voltage and for sweeping the voltage comprises means operable temporarily to connect the said filter capacitor to a source of said predetermined voltage and means connected to one of said current sources to control the latter to cause sweeping of the capacitor voltage.

12. An object detector as claimed in claim 3, in which said first means further includes sensing means having an output connected to said first input and responsive to a voltage level below a predetermined value to provide a signal to said bistable device to put same into said first state.

13. An object detector including:
a first oscillator having an object-sensitive inductive loop as a frequency determining element therefor; a phase lock loop (PLL) including a voltage controlled oscillator (VCO) and a reference frequency source from which is generated a plurality of frequencies to which the VCO frequency is lockable; means coupling the VCO to the first oscillator to inject the VCO signal into the first oscillator for locking the first oscillator frequency to that of the VCO; means responsive to the first oscillator and VCO frequency signals to provide a signal indicative of the frequencies being equal; control means connected to the PLL and settable into a first state disabling normal operation of the PLL and into a second state enabling normal operation of the PLL; and means activated by said control means being set into its first state to cause said VCO to sweep over a frequency range; said control means being responsive to said frequency equalisation indicative signal to be set into its second state.

14. An object detector as claimed in claim 13 in which said PLL comprises a loop filter for the VCO control signal that includes a shunt capacitor, first and second current sources connected to said shunt capacitor to supply current to charge and discharge same respectively, and a comparator for controlling the relative periods of operation of said current sources in dependence on the phase of frequency signals from said VCO and said reference frequency source.

15. An object detector as claimed in claim 14 in which said PLL is operable to lock the VCO frequency over a range of multiples of the reference frequency.

16. An object detector as claimed in claim 14 in which said sweep means comprises means for establishing a predetermined voltage on said shunt capacitor and means associated with one of the current sources to activate same to sweep the capacitor voltage and therewith the VCO frequency.

17. An object detector as claimed in claim 15 in which said sweep means comprises means for establishing a predetermined voltage on said capacitor and means associated with one of the current sources to activate same to sweep the capacitor voltage and therewith the VCO frequency.

18. An object detector as claimed in claim 13 further comprising sensing means responsive to a voltage level being below a predetermined value to set said control means into its first state.

19. An object detector as claimed in claim 9 or claim 18 in which the voltage level to which said sensing means is responsive is a voltage in a power supply unit for the detector.

* * * * *